US008199894B2

(12) United States Patent
Adonailo et al.

(10) Patent No.: US 8,199,894 B2
(45) Date of Patent: Jun. 12, 2012

(54) ADVANCED CALL FORWARDING

(75) Inventors: Robert S. Adonailo, Rockville Centre, NY (US); David Mole, Medford, NY (US); Maria I. DeGori, Glassboro, NJ (US)

(73) Assignee: Honeywell International Inc., Morristown, NJ (US)

( * ) Notice: Subject to any disclaimer, the term of this patent is extended or adjusted under 35 U.S.C. 154(b) by 1104 days.

(21) Appl. No.: 11/831,488

(22) Filed: Jul. 31, 2007

(65) Prior Publication Data

US 2009/0034708 A1 Feb. 5, 2009

(51) Int. Cl.
*H04M 3/42* (2006.01)

(52) U.S. Cl. ............... 379/211.02; 379/42; 370/356

(58) Field of Classification Search ......... 379/211.02, 379/88.02, 57; 340/506; 370/356
See application file for complete search history.

(56) References Cited

U.S. PATENT DOCUMENTS

| 5,428,663 A * | 6/1995 | Grimes et al. ......... 340/7.21 |
| 5,901,211 A | 5/1999 | Dean et al. |
| 6,049,273 A * | 4/2000 | Hess ................ 340/539.11 |
| 6,125,126 A * | 9/2000 | Hallenst.ang.l ............ 370/522 |
| 6,154,525 A | 11/2000 | Formosa |
| 6,370,233 B1 | 4/2002 | Bennett, III et al. |
| 6,931,104 B1 * | 8/2005 | Foster et al. ............ 379/88.02 |
| 6,931,117 B2 * | 8/2005 | Roberts et al. ........ 379/215.01 |
| 7,123,138 B1 * | 10/2006 | Infosino ................ 340/506 |
| 2002/0037004 A1 * | 3/2002 | Bossemeyer et al. ...... 370/356 |
| 2006/0103520 A1 * | 5/2006 | Clark .................... 340/506 |

OTHER PUBLICATIONS

Electronics Design and Manufacturing Pty Limited, Solution 880, Operators Manual, May 25, 2001, Issue 1.10, No. MA408O, Sydney, Australia.
Bosch, Intrusion Systems, CC408 Solution 880 Control Panel, www.boschsecuritysystems.com.

* cited by examiner

*Primary Examiner* — Davetta W Goins
*Assistant Examiner* — Phan Le
(74) *Attorney, Agent, or Firm* — Husch Blackwell

(57) ABSTRACT

The present invention advantageously provides a method and system that combines arming and disarming of a security system with activation and deactivation of call forwarding, enabling a single input by an authorized user to alter the state of the security system and to activate or deactivate call forwarding. Further, when changing the state of the security system, a user authorization component determines whether call forwarding should be activated. Hence, forwarding of calls is based on both user criteria and the state of the system. Additionally, the state of call forwarding can be changed by an authorized user via the security system.

10 Claims, 2 Drawing Sheets

ADVANCED CALL FORWARDING

FIELD OF THE INVENTION

This invention relates generally to security systems. In particular, this invention relates to a security system apparatus and method for combining the arming/disarming functionality of the security system with a call forwarding capability of a telephone system.

BACKGROUND OF THE INVENTION

Security systems are used to monitor homes and businesses to prevent unwanted intrusions as well as to guard against natural disasters. Critical to the operation of such security systems is their arming and disarming. Generally a security system is armed and disarmed using a keypad on a control panel residing within the structure that the system monitors; however, other arming/disarming methods or devices can be used. Another aspect of home or business security relates to telephone usage. An unanswered telephone can reveal that the home or business is not occupied, not only causing business opportunities to be missed, but also potentially inviting intrusions. However, the call forwarding telephone feature can be used to enable a telephone to be answered away from the physical location of the telephone. Currently, users that have both a security system and the call forwarding telephone feature on their telephone systems have to perform two sets of actions when leaving their premises. The first is to setup their call forwarding via their telephone system, and the second is to arm their security system via their keypad or other arming device.

A switching system for automatically transferring a telephone call is disclosed in U.S. Pat. No. 5,901,211 for System and Method for Automatically Transferring Calls or Allowing Access. This switching system enables the opening of a door, or other event, to cause telephone calls to be automatically forwarded. The system can be used, for example, in a hotel, as follows. When a customer enters the hotel room using an electronic key, the system detects the key opening the door and switches off automatic call forwarding, and when the customer leaves the room, the system switches on the automatic call forwarding so that calls to the hotel room are forwarded to the customer's cell phone.

U.S. Pat. No. 6,370,233, A Security System with Call Management Functionality, discloses connecting a security system to a telephone line. The system includes automated attendant service functions, such as a "follow me" service in which all calls are directed to either voice mail or a known location, depending on the user's physical location or on the time of day. Accordingly, the operation of the telephone's call forwarding feature in accordance with the security system is based on the user's location as sensed by the security system, or on time of day based on security system programming. Altering the state of the security system, from armed to disarmed or vice versa, or other user input from the keypad or other input device, does not change the activation of call forwarding.

U.S. Pat. No. 6,154,525, Security System with Call Forwarding Activation, discloses a security system configured to automatically enable and disable telephone functions in response to changes in the operational state of the system. For example, when the system state is changed to a higher level of security, call forwarding is enabled. However, other system changes or user criteria do not affect call forwarding.

Among the problems of the aforementioned systems are the necessity to perform more than one activity to both change the state of the security system and to activate and/or deactivate call forwarding, and the inability to adjust the call forwarding feature based on user preferences and/or user criteria.

SUMMARY OF THE INVENTION

The present invention advantageously provides a method and system that combines arming and disarming of a security system with activation and deactivation of call forwarding, enabling a single input by an authorized user to alter the state of the security system and to activate or deactivate call forwarding. Further, when changing the state of the security system, a user authorization mechanism or component determines whether call forwarding should be activated. Hence, forwarding of calls is based on both user criteria and the state of the system.

A system for changing a state of a security system and a state of a call forwarding feature of a telephone system is presented, the system having a control panel, associated with the security system, capable of changing the state of the security system in response to a user input, and an authorization component indicating whether a user has the authority to change the state of the call forwarding feature, so that when a user inputs an instruction to change the state of the security system, if the user is authorized to change the state of the call forwarding feature, it is also changed.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

The foregoing and other objects, aspects, features, advantages of the invention will become more apparent from the following description and from the claims.

DETAILED DESCRIPTION OF THE INVENTION

An inventive solution is presented to the need for a security system operable with a telephone system such that a call forwarding feature of the telephone system can be activated by the security system when the security system state changes. The invention allows the call forwarding function of the telephone system to be automatically activated and/or deactivated when authorized users perform the function of arming and/or disarming their security systems. This happens in a single, automatic step, as opposed to having to do both functions separately.

Figure 1:
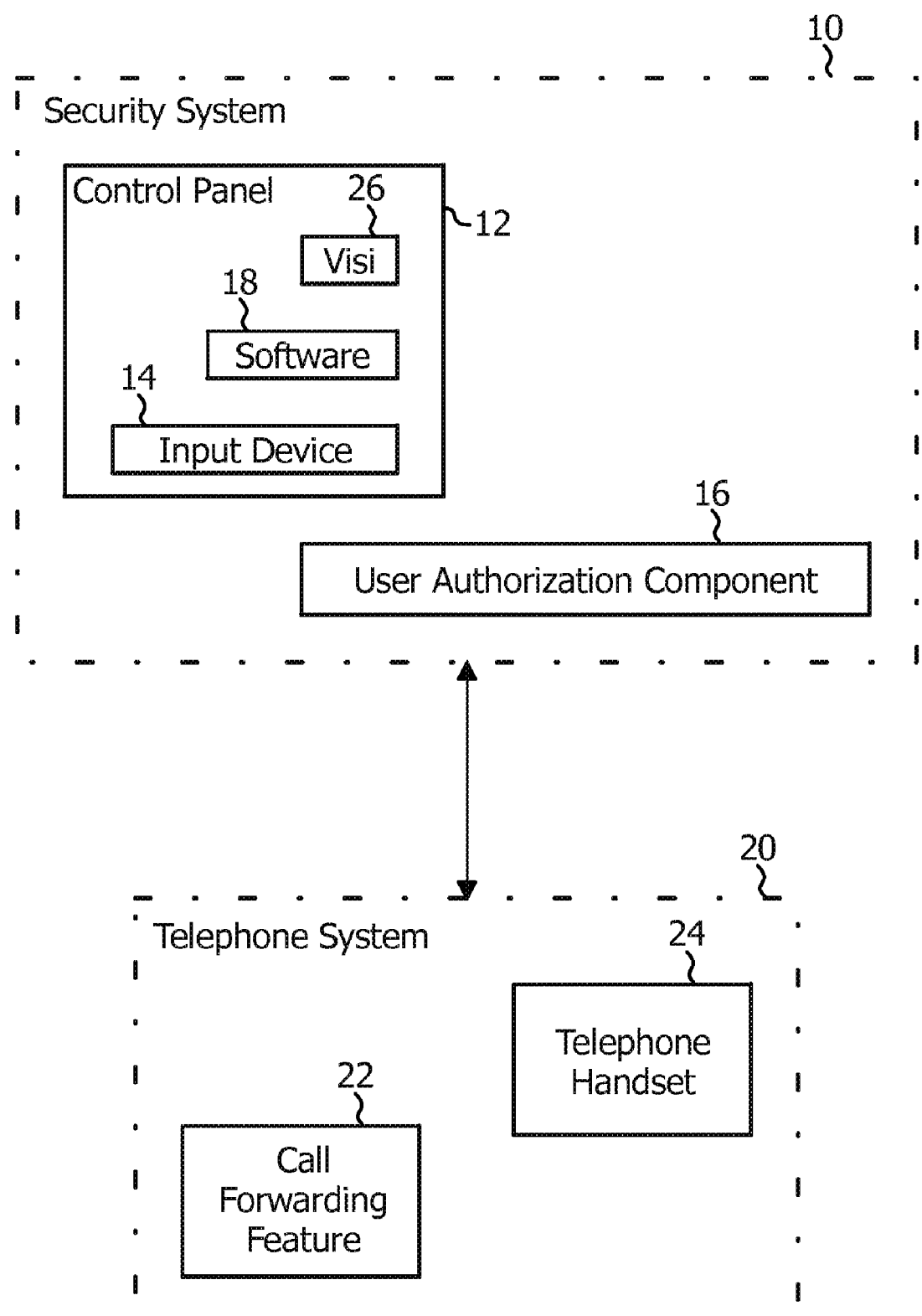
FIG. 1 is a block diagram of an exemplary embodiment of the present invention.

FIG. 1 shows an exemplary embodiment of the invention. A security panel or control panel 12 resides in a home, office or other structure being monitored by a security system 10. The control panel 12 has an input device 14 through which the user can identify himself to the system 10, and can input commands or system instructions, such as to arm and disarm the security system 10, changing the system's state. The input device 14 can be a physical or virtual keypad, or other arming device. The control panel 12 has software 18 that can perform functions to implement a call forwarding feature 22 of a telephone system 20. The security system 10 includes, for each user, a user authorization component 16, typically stored in the control panel 12, to indicate the user's privileges and capabilities. For example, a user can be authorized to arm and/or disarm the entire system 10, or merely authorized to arm and/or disarm portions of the system 10. Further, a user can be authorized to activate and deactivate call forwarding 22, as discussed below. The user's authorization component 16 is established when the user is entered into the system. In one embodiment, the user authorization component 16 can be a value or data stored in the control panel 12.

The structure being monitored by the security system 10 also has a telephone system 20 that includes a call forwarding feature 22. In one embodiment, a visual indication ("Visi") 26 appears on the control panel 12 to indicate the state of the call forwarding feature 22. If a user of the security system 10 is authorized to arm and/or disarm the security system 10 and is also allowed to activate and/or deactivate the call forwarding feature 22, then the user authorization component 16 of the security system indicates this authority. The user authorization component 16 can include, for example, an authorization level providing users having a higher authorization level with more capabilities than users with lower authorization levels. Hence, a user with a high authorization level can be permitted to arm and/or disarm the system 10 and activate/deactivate call forwarding 22, while one with a low authorization level can only arm and/or disarm the system 10. For example, in a home security system, both parents can have the maximum authorization code, so that either parent can implement each and every feature of the security system, including arming and disarming system, as well as activating and deactivating call forwarding, while both children have a lower authorization code, so that each child can arm and disarm the system but neither can influence call forwarding. When call forwarding is activated by the security system, call forwarding becomes active and telephone calls are forwarded to a predetermined telephone number.

The telephone number to which calls are forwarded can be stored in the control panel 12. In one embodiment, only one telephone number is stored, enabling all calls to be forwarded to the same number when the call forwarding feature is active, regardless of which user activated the call forwarding feature 22. In another embodiment, each authorized user can store a telephone number to which calls are forwarded when he activates call forwarding. An authorized user can change the number to which his calls are forwarded using the input device 14 of the security system 10.

In addition, commands from the input device 14 can enable the user to activate or deactivate the call forwarding feature 22 without having to physically access the telephone handset 24 or supply the appropriate call forwarding number sequences to the telephone system 20. Specific commands, input by a user using the input device 14, can enable the user to activate and/or deactivate the call forwarding feature 22 as needed, without changing the state of the security system 10. In one embodiment, the user can press code #91 to activate and code #92 to deactivate the call forwarding feature 22 to forward or stop forwarding calls without changing the state of the security system. For example, if an authorized user is leaving the premises but others are remaining, the authorized user can press code #91 to have his calls forwarded while the security system remains armed/disarmed. Accordingly, the state of the call forwarding feature 22 can be modified directly by the user, if desired.

Figure 2:
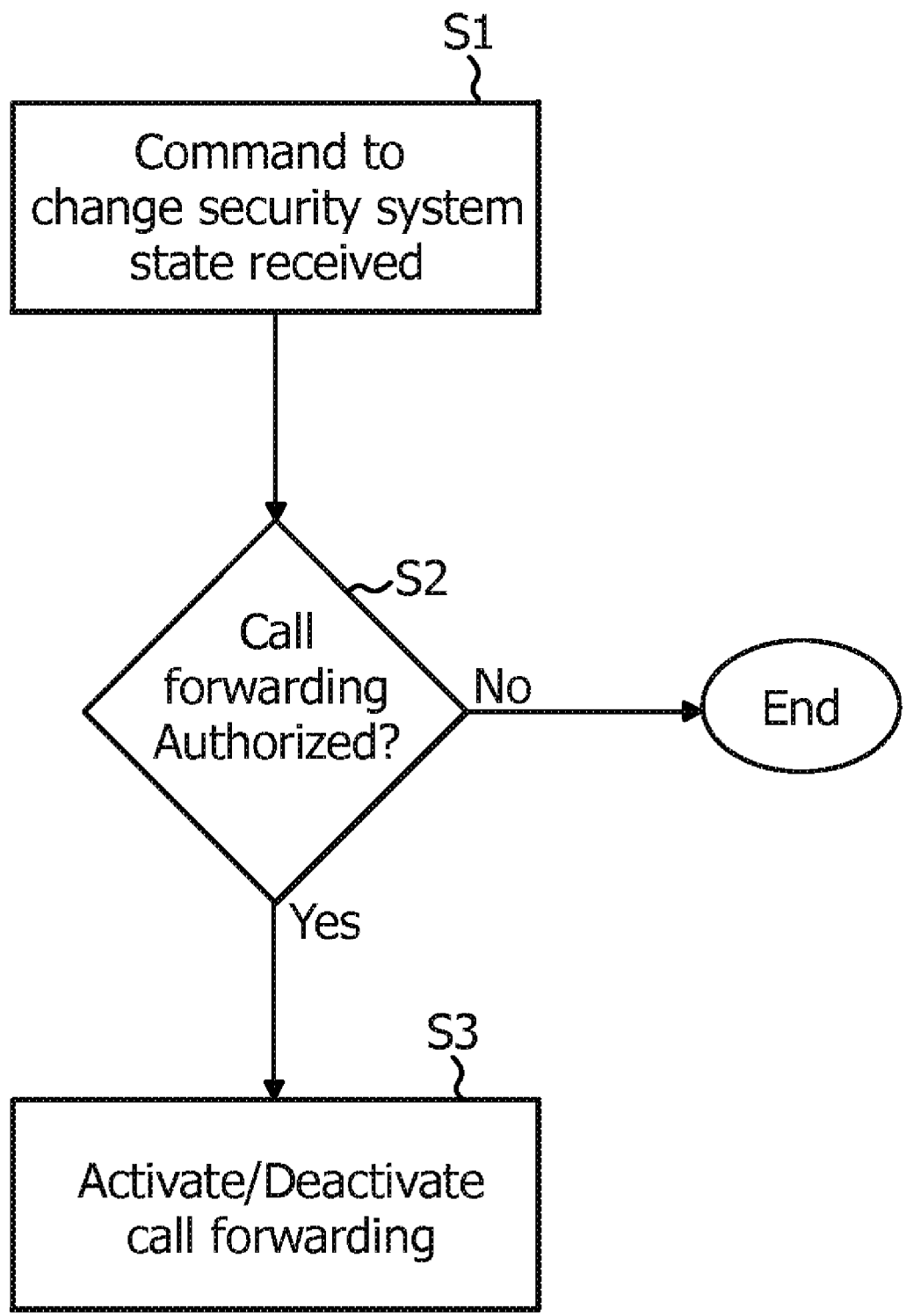
FIG. 2 is a flow diagram illustrating the steps for an exemplary embodiment of the present invention.

FIG. 2 illustrates the steps in an exemplary embodiment of the inventive system shown in FIG. 1. Initially, at step S1, a user enters his identification (ID) information, followed by command or system instruction, to arm or disarm the security system 10. Next, at step S2, the user authorization component 16 is consulted. Based on the ID, if the user who entered the command is authorized to alter the call forwarding feature 22 (S2=YES), then it is altered, that is, either activated or deactivated, as appropriate, in step S3, and the process ends. If the user is not authorized (S2=NO), the process ends without modification of the state of the call forwarding feature.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for changing a state of a security system that monitors a structure and a state of a call forwarding feature of a telephone system associated with the structure, comprising:
   a control panel associated with the security system having a plurality of stored telephone numbers to which calls are forwarded, the control panel operable to change the state of the security system in response to a user input entered into the control panel of the security system through an input device located on the control panel, the user input including any one of a plurality of authorization codes where the plurality of authorization codes includes a first authorization code that arms or disarms the security system and activates or deactivates the call forwarding system with regard to a first telephone number of the plurality of stored telephone numbers and a second authorization code that arms or disarms the security system and activates or deactivates the call forwarding system with regard to a second telephone number of the plurality of stored telephone numbers; and
   an authorization component, embodied as a non-transitory computer readable medium, operable to indicate whether a user has authority to change the state of the call forwarding feature of the telephone system,
   wherein when the state of the security system is changed, if the user has authority to change the state of the call forwarding feature of the telephone system via entry of one of the first and second authorization codes, the state of the call forwarding feature of the telephone system is changed with respect to one of the first and second telephone numbers responsive to the user input entered into the control panel of the security system.

2. The system according to claim 1, wherein the authorization component includes an authorization level.

3. The system according to claim 1, wherein the control panel includes a single telephone number to which calls are forwarded when the state of the call forwarding feature is active.

4. The system according to claim 1, wherein the control panel includes a telephone number for an authorized user to which calls are forwarded when the call forwarding state is activated by the authorized user.

5. A method for combining a security system that monitors a structure and a call forwarding feature of a telephone system associated with the structure, said method, embodied as software as a non-transitory computer readable medium, comprising:
   storing a plurality of telephone numbers in a control panel of the security system residing within the structure;
   changing a state of the security system in response to a request entered into the security system through a user input device located on the control panel the user input including any one of a plurality of authorization codes where the plurality of authorization codes includes a first authorization code that arms or disarms the security system and activates or deactivates the call forwarding system with regard to a first telephone number of the plurality of stored telephone numbers and a second authorization code that arms or disarms the security system and activates or deactivates the call forwarding system with regard to a second telephone number of the plurality of stored telephone numbers; and changing a state of the call forwarding of the telephone system feature with respect to one of the first and second telephone numbers in accordance with an authorization component of the security system and responsive to the request entered into the security system via entry of one of the first and second authorization codes.

6. The method according to claim 5, wherein the authorization component includes an authorization level.

7. The method according to claim 5, wherein the control panel includes a single telephone number to which calls are forwarded when the state of the call forwarding feature is active.

8. The method according to claim 5, wherein the control panel includes a telephone number for an authorized user to which calls are forwarded when the call forwarding state is activated by the authorized user.

9. A system combining a security system that monitors a structure and a call forwarding feature of a telephone system associated with the structure, comprising:

a control panel associated with the security system having a plurality of stored telephone numbers used for call forwarding, the control panel operable to change a state of the call forwarding feature in response to a user input entered into the control panel of the security system through an input device located on the control panel, the user input including any one of a plurality of authorization codes where the plurality of authorization codes includes a first authorization code that arms or disarms the security system and activates or deactivates the call forwarding system with regard to a first telephone number of the plurality of stored telephone numbers and a second authorization code that arms or disarms the security system and activates or deactivates the call forwarding system with regard to a second telephone number of the plurality of stored telephone numbers; and an authorization component, embodied as a non-transitory computer readable medium, operable to indicate whether a user has authority to change the state of the call forwarding feature of the telephone system, wherein if the user has authority to change the state of the call forwarding feature of the telephone system via entry of one of the first and second authorization codes, the state of the call forwarding feature of the telephone system is changed with respect to one of the first and second telephone numbers responsive to the user input entered into the control panel of the security system.

10. A method for combining a security system that monitors a structure and a call forwarding feature of a telephone system associated with the structure, said method, embodied as software as a non-transitory computer readable medium, comprising:

storing a plurality of telephone numbers used for call forwarding in a control panel of the security system residing within the structure;

determining an authorization component of a user of the security system in response to a request by the user entered into the security system through an input device located on the control panel, the user request and authorization component including one of a plurality of authorization codes where the plurality of authorization codes includes a first authorization code that arms or disarms the security system and activates or deactivates the call forwarding system with regard to a first telephone number of the plurality of stored telephone numbers and a second authorization code that arms or disarms the security system and activates or deactivates the call forwarding system with regard to a second telephone number of the plurality of stored telephone numbers; and changing a state of the call forwarding feature of the telephone system with respect to one of the first and second telephone numbers in response to the request by the user entered into the security system and in accordance with the authorization component via entry of one of the first and second authorization codes.

* * * * *